UNITED STATES PATENT OFFICE.

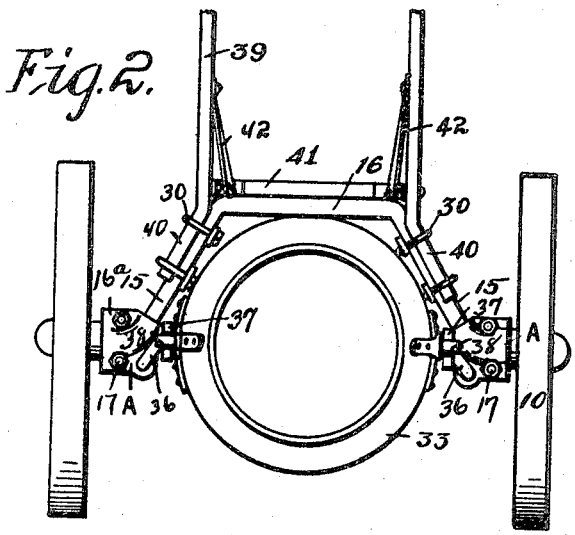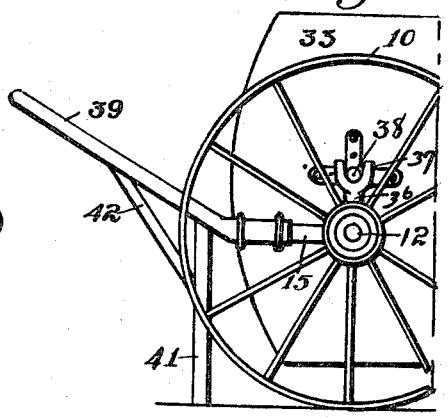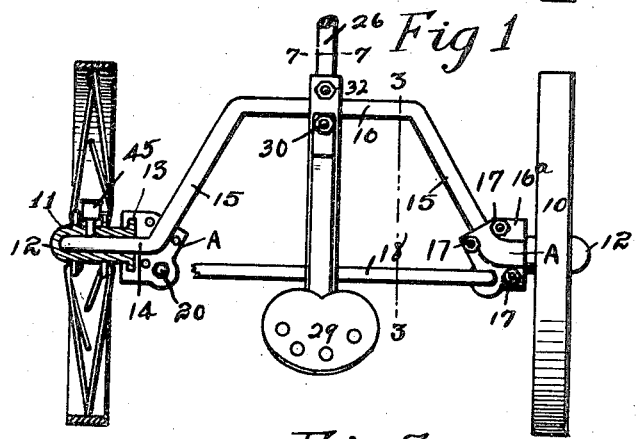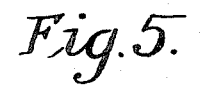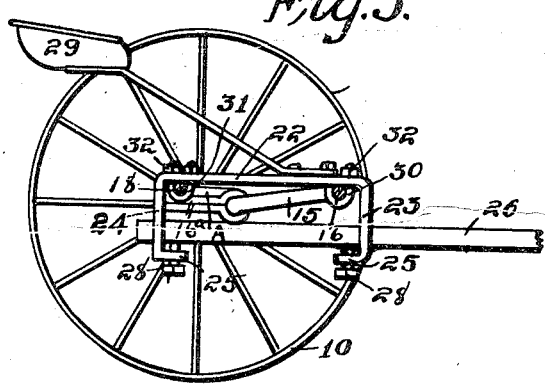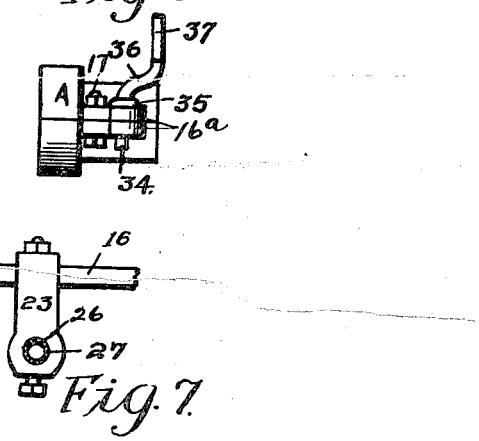

ALFRED A. NELSON AND WALTER NELSON, OF ATLANTIC, IOWA.

COMBINATION-CART.

1,163,603.  Specification of Letters Patent.  Patented Dec. 7, 1915.

Application filed October 26, 1914. Serial No. 868,775.

*To all whom it may concern:*

Be it known that we, ALFRED A. NELSON and WALTER NELSON, citizens of the United States, and residents of Atlantic, in the county of Cass and State of Iowa, have invented a certain new and useful Combination-Cart, of which the following is a specification.

The object of our invention is to provide a cart of simple, durable and inexpensive construction of the type adapted to be used for a harrow cart, and which may be readily and easily changed, adapted for transporting water to a water barrel or the like.

A further object is to provide in such a cart simple and easily operated means for connecting the tongue and seat to the cart frame, or for disconnecting them.

A further object is to provide in such a cart an easily adjustable means for mounting a barrel on the cart.

Still a further object is to provide new and novel means for mounting wheels on our cart.

Our invention consists in certain details, in the construction, combination and arrangement of the various parts of the device, whereby the objects contemplated are attained, as hereinafter more fully set forth, pointed out in our claims, and illustrated in the accompanying drawings, in which:

Figure 1 shows a top or plan view of the cart embodying our invention, one wheel being shown in a horizontal cross section. Fig. 2 shows a similar view of the cart, and with the parts installed for supporting a barrel. Fig. 3 shows a sectional view taken on the line 3—3 of Fig. 1. Fig. 4 shows a side elevation of the cart shown in Fig. 2. Fig. 5 shows a detail view of part of the means for mounting wheels on the cart. Fig. 6 shows a similar view with the brackets for supporting a barrel, installed in position, and Fig. 7 shows a detail sectional view taken on the line 7—7 of Fig. 1.

In the accompanying drawings, we have used the reference numeral 10 to indicate generally the cart wheels, which may be of any ordinary construction, excepting that the hubs 11 are closed at their ends 12, and are provided with horizontal openings at their inner ends to receive the ends of the frame members. The hubs 11 are provided with annular flanges 13. Received in the openings in the hubs, are horizontal frame members 14. The frame members at points slightly spaced from the inner ends of the hubs are inclined forwardly at 15. The forward ends of the portions 15 of said frame member are integrally connected by a horizontal transverse frame member 16. Connected with each hub is a double bearing member generally indicated by the reference character A shown in Fig. 2. The lower half of the double bearing member A, is formed with a groove which receives the portions of the members 14 and 15, and also with a groove to receive the lower half of the hub 12, and the flange 13 thereon. The upper half of the double bearing member A is similarly constructed and fits over the upper half of the inner end of the hub 11, and the upper halves of the portions of the members 14 and 15. The halves of the double bearing member A are provided with flanges 16ª, and are bolted together by means of bolts 17 extending through said flanges. The flange 16ª, at the rear sides of the double bearing A is extended, and through the flanges on both members of said double bearing member is formed a vertical opening 20. For connecting the double bearing members, on opposite sides when the cart is used as a harrow cart, or the like a horizontal frame member 18 is provided having at its ends downward extensions 19 received in the openings. It will be seen that by simply lifting the rod 18, the extensions 19 may be removed from the bearing A. The lower ends of the members 19 are preferably provided with openings to receive the pins 21.

We provide seat supporting brackets comprising the horizontal and longitudinal bracket 22 having downwardly extending brackets 23 and 24 at its forward and rearward ends. At the lower ends of the members 23 and 24 are right angled extensions 25. The members 23 and 24 are provided with openings 27 which register with each other and receive the tongue 26 which may be tubular in form. Extended through the members 25 are set screws 28 for locking the tongue in position. Mounted on the member 22 is a seat 29. The member 22 is also secured to the members 16 and 18 by means of U shaped brackets 30 and 31 which receive said members 16 and 18 and the ends of which are extended through the member 22 and receive nuts 32.

The cart as already described, is adapted for use as a harrow cart or the like. The front end of the tongue 26 may be secured to the harrow draw bar and by loosening the set screws 28 the tongue may be adjusted longitudinally of the cart with relation to the members 23 and 24 for placing the cart at any desired length from the harrow.

When it is desired to adapt our cart for use for carrying a barrel 33, the set screws 28 are loosened and the tongue 26 is removed. The nuts 32 are removed and the member 22 is taken away. The pins 21 may then be withdrawn from the opening in the members 19. The member 18 may be lifted out and removed from the cart. We provide suitable brackets having the vertical portions 34 at the upper ends of which are annular ribs 35. The brackets are provided with portions 36 curved inwardly and upwardly from the portions 34 and the upper ends of the portions 36 are bifurcated forming parallel upward extending fingers 37. The portions 34 are inserted into the opening 20. Their movement through the opening 20 is limited by the ribs 35. The barrel 33 is provided on the opposite side with laterally extending hinges or shafts 38, which rest between the fingers 37 of the respective brackets. The pins 38 are arranged above the center of gravity of the barrel, so that the barrel will be held by gravity against tilting. We provide a pair of shafts 39 which at their rear ends are inclined rearwardly and outwardly at 40 to rest against the members 15. The members 40 and 15 are screwed together by U shaped brackets 30 of the type already described. The shafts 39 are connected by transverse member 41, which is arched downwardly and forms a support to prevent the shafts 39 from dropping to the ground. Braces 42 connect the shafts 39 and member 41. It will readily be seen that the cart may easily be changed for use as a harrow cart or for carrying a barrel or the like.

The inner part in which the axle of the cart is mounted in the hub is believed to have distinct advantages, insomuch, as it prevents the admission of dust to the interior of the hub, and also holds oil which may be admitted through the grease cups 45, and the passages communicating therewith.

It will be understood that some changes may be made in the details of the construction of our cart without departing from its essential features, and it is our intent to cover by this application any such changes which may be included within the scope of the following claims.

We claim as our invention:

1. In a device of the class described, a cart having a pair of wheels, having hollow hubs closed at one end and formed with circumferential flanges at their other ends, an axle having its ends received in said hubs, two two part bearings, each portion of each bearing being adapted to receive half of one end portion of said axle, and half of the flange of one hub, a cross-bar mounted on said bearings, said bearings being provided with vertical openings, said cross bar being provided with downward extensions to be received in said openings, and a tongue suitably mounted on said axle and said bar.

2. In a device of the class described, a cart having a pair of wheels, having hollow hubs closed at one end and formed with circumferential flanges at the other end, an axle having its ends received in said hubs, two two part bearings, each portion of each bearing being adapted to receive half of one end portion of said axle, and half of the flange of one hub, a cross bar detachably mounted on said bearings, said axle being arched forwardly and slightly upwardly in its central portion, and a tongue mounted on said axle and bar, and capable of longitudinal adjustment in the cart.

3. In a device of the class described, a cart having a pair of wheels, having hollow hubs closed at one end and formed with circumferential flanges at the other end, an axle having its ends received in said hubs, two two part bearings, each portion of each bearing receiving half of the one end portion of said axle, and half of said flange of one hub, a cross bar mounted on said bearings, said bearings being provided with vertical openings, said cross bar being provided with downward extensions received in said openings, said axle being arched forwardly and slightly upwardly in its central portion, a horizontal longitudinal member resting upon said cross bar and the central forward portion of said axle, having downward extensions, a tongue slidably mounted in said downward extensions, and means for locking said tongue in said extensions.

4. In a cart, a pair of wheels, having hubs, an axle connecting said wheels arched forward in said cart at its central portion, bearing members for connecting said axle with the hubs, a cross-bar detachably mounted on said bearings, brackets detachably mounted on said cross-bar and said axle, a seat mounted on said cross-bar, and a tongue detachably mounted in said brackets.

5. In a cart, a pair of wheels, having hubs, an axle connecting said wheels arched forward in said cart at its central portion, bearing members for connecting said axle with the hubs, said bearings having vertical openings, brackets mounted in said openings, a barrel mounted on said brackets above its center of gravity, a member detachably secured to said axle for drawing the cart forward, and a supporting means on said last member for preventing said member from dropping to the ground.

Des Moines, Iowa, September 18, 1914.

ALFRED A. NELSON.
WALTER NELSON.

Witnesses:
M. B. NELSON,
OTTO T. BREHMER.